(12) United States Patent
Tanaka et al.

(10) Patent No.: US 10,934,444 B2
(45) Date of Patent: *Mar. 2, 2021

(54) RADIATION-CURABLE INK JET COMPOSITION AND INK JET RECORDING METHOD

(71) Applicant: Seiko Epson Corporation, Tokyo (JP)

(72) Inventors: Kyohei Tanaka, Matsumoto (JP); Keitaro Nakano, Matsumoto (JP); Midori Sekine, Matsumoto (JP)

(73) Assignee: Seiko Epson Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/581,845

(22) Filed: Sep. 25, 2019

(65) Prior Publication Data

US 2020/0102464 A1 Apr. 2, 2020

(30) Foreign Application Priority Data

Sep. 27, 2018 (JP) .............................. JP2018-181438

(51) Int. Cl.
| | | |
|---|---|---|
| *C09D 11/101* | (2014.01) | |
| *B41J 11/00* | (2006.01) | |
| *B41M 5/00* | (2006.01) | |
| *C09D 11/107* | (2014.01) | |
| *C09D 11/30* | (2014.01) | |
| *B41J 2/21* | (2006.01) | |

(52) U.S. Cl.
CPC .......... *C09D 11/101* (2013.01); *B41J 2/2107* (2013.01); *B41J 11/002* (2013.01); *B41M 5/0023* (2013.01); *C09D 11/107* (2013.01); *C09D 11/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2200/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/04588; B41J 2/04595; B41J 2/04586; B41J 2/14274; B41J 3/4078; B41J 11/06; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/107; D06P 1/0032; D06P 1/0096; D06P 5/001; D06P 5/02; D06P 5/2011; D06P 5/2077; D06P 5/2083; D06P 5/30; Y10T 428/24802
See application file for complete search history.

(56) References Cited

U.S. PATENT DOCUMENTS

| | | |
|---|---|---|
| 8,501,830 B2 | 8/2013 | Selman et al. |
| 8,940,813 B2 | 1/2015 | Araki et al. |
| 9,051,481 B2 | 6/2015 | Yoshino et al. |
| 9,101,955 B2 | 8/2015 | Araki et al. |
| 9,855,693 B2 | 1/2018 | Umebayashi |
| 2010/0285282 A1 | 11/2010 | Selman et al. |
| 2011/0223391 A1 | 9/2011 | Nishimura et al. |
| 2012/0229583 A1* | 9/2012 | Fukumoto ............ B41M 5/0023 347/102 |
| 2012/0274717 A1* | 11/2012 | Nakano .................. B41J 2/2107 347/102 |
| 2013/0010039 A1* | 1/2013 | Kida ...................... B41J 2/2107 347/100 |
| 2013/0260092 A1 | 10/2013 | Araki et al. |
| 2013/0295342 A1 | 11/2013 | Araki et al. |
| 2014/0370214 A1 | 12/2014 | Araki et al. |
| 2015/0064398 A1 | 3/2015 | Umebayashi |
| 2015/0077481 A1 | 3/2015 | Yoshino et al. |
| 2015/0130878 A1* | 5/2015 | Kohzuki .............. C09D 11/101 347/85 |
| 2015/0315396 A1* | 11/2015 | Kida ...................... B41J 2/2107 347/20 |
| 2017/0233594 A1* | 8/2017 | Yoda .................... B41M 5/0023 347/102 |

(Continued)

FOREIGN PATENT DOCUMENTS

| | | |
|---|---|---|
| EP | 2 644 664 A1 | 10/2013 |
| EP | 2 653 511 A1 | 10/2013 |
| EP | 2 842 763 A2 | 3/2015 |

(Continued)

*Primary Examiner* — Manish S Shah

(74) *Attorney, Agent, or Firm* — Harness, Dickey & Pierce, P.L.C.

(57) ABSTRACT

A radiation-curable ink jet composition includes monomers, the monomers including 86% by mass or more of one or more monofunctional monomers relative to all the monomers, where a glass transition temperature of the radiation-curable ink jet composition calculated from glass transition temperatures of all the monomers is 42° C. or higher.

5 Claims, No Drawings

(56) References Cited

U.S. PATENT DOCUMENTS

2018/0002552 A1  1/2018  Nakano et al.

FOREIGN PATENT DOCUMENTS

| EP | 2 848 660 A1 | 3/2015 |
|---|---|---|
| JP | 2007-321034 A | 12/2007 |
| JP | 2014-240153 A | 12/2014 |
| JP | 2015-014009 A | 1/2015 |
| JP | 2017-141382 A | 8/2017 |
| JP | 2018-009142 A | 1/2018 |

* cited by examiner

RADIATION-CURABLE INK JET COMPOSITION AND INK JET RECORDING METHOD

The present application is based on, and claims priority from, JP Application Ser. No. 2018-181438, filed Sep. 27, 2018, the disclosure of which is hereby incorporated by reference herein in its entirety.

BACKGROUND

1. Technical Field

The present disclosure relates to a radiation-curable ink jet composition and an ink jet recording method using the composition.

2. Related Art

As described in JP-A-2018-9142, for example, a radiation-curable ink jet composition having low odor as well as good curing properties and flexibility after curing has been conventionally known. In particular, a radiation-curable ink jet composition containing, as monomers, 39% by mass of phenoxyethyl acrylate, 20% by mass of acryloylmorpholine, 15% by mass of N-vinylcaprolactam, 10% by mass of 2-(2-vinyloxyethoxy)ethyl acrylate, and a difunctional urethane acrylate is described in Example 9 (Table 3).

However, when employed for sign uses, the radiation-curable ink jet composition described in JP-A-2018-9142 has a problem in which flexibility and/or adhesion of a coating film tend to become unsatisfactory. In addition, when a proportion of monofunctional monomers relative to all the monomers is increased to enhance flexibility and/or adhesion, there is a problem in which scratch resistance of a coating film deteriorates in some cases.

SUMMARY

A radiation-curable ink jet composition of the present application contains monomers, the monomers including 86% by mass or more of one or more monofunctional monomers relative to all the monomers, where a glass transition temperature of the radiation-curable ink jet composition calculated from glass transition temperatures of all the monomers is 42° C. or higher.

The above-mentioned radiation-curable ink jet composition may contain a monomer, represented by the following general formula (1):

$$CH_2=CR^1-COOR^2-O-CH=CH-R^3 \quad (1)$$

where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

In the above-mentioned radiation-curable ink jet composition, the monofunctional monomers may include a monomer having a glass transition temperature of 90° C. or higher.

In the above-mentioned radiation-curable ink jet composition, any of the monofunctional monomers may be N-vinylcaprolactam or acryloylmorpholine.

An embodiment of the ink jet recording method of the present disclosure may include: attaching the above-mentioned radiation-curable ink jet composition to a recording medium; and irradiating the radiation-curable ink jet composition with light from a UV-LED.

DESCRIPTION OF EXEMPLARY EMBODIMENTS

Hereinafter, embodiments of the present disclosure will be described. The following embodiments will be described as examples of the present disclosure. Accordingly, the present disclosure is by no means limited to the following embodiments and includes various modifications carried out without changing the gist of the present disclosure. It is noted that all the constitution described hereinafter is not necessarily the essential constitution of the present disclosure.

Herein, "(meth)acryloyl" means at least either of acryloyl and the corresponding methacryloyl, "(meth)acrylate" means at least either of an acrylate and the corresponding methacrylate, and "(meth)acrylic" means at least either of acrylic and the corresponding methacrylic.

1. Radiation-Curable Ink Jet Composition

A radiation-curable ink jet composition of the present embodiment is a composition used through discharge from an ink jet head by an ink jet method. Hereinafter, an embodiment of a radiation-curable ink jet composition will be described. Such a composition, however, may be a composition other than ink compositions, such as a composition used for 3D fabrication, for example.

A radiation-curable ink jet composition of the present embodiment is cured upon exposure to radiation. Examples of such radiation include ultraviolet rays, infrared rays, visible light, and X-rays. As the radiation, ultraviolet rays are preferable since the radiation sources are readily available and widely used, and further, materials suitable for curing with ultraviolet radiation are readily available and widely used.

A radiation-curable ink jet composition of the present embodiment contains 86% by mass or more of one or more of monofunctional monomers relative to all the monomers, where a glass transition temperature of the radiation-curable ink jet composition calculated from glass transition temperatures of all the monomers is 42° C. or higher.

Hereinafter, a radiation-curable ink jet composition of the present disclosure will be described in terms of components to be contained, physical properties, and a manufacturing method.

1. 1. Monomers

Exemplary monomers in the present embodiment include: monofunctional monomers each having one polymerizable functional group; and polyfunctional monomers each having a plurality of polymerizable functional groups.

A radiation-curable ink jet composition of the present embodiment contains 86% by mass or more of one or more monofunctional monomers relative to all the monomers. The content of monofunctional monomers relative to all the monomers is preferably 86% by mass or more and 99% by mass or less, more preferably 94% by mass or more and 99% by mass or less, and further preferably 96% by mass or more and 99% by mass or less. When the content of monofunctional monomers relative to all the monomers is 86% by mass or more, flexibility and adhesion of a coating film can be enhanced. In addition, it is possible to further enhance flexibility and adhesion when the content is 94% by mass or more and to further enhance adhesion when the content is 96% by mass or more. Meanwhile, the content of monofunctional monomers relative to all the monomers is preferably 99% by mass or less. When the content is 99% by mass or less, scratch resistance can be enhanced.

Moreover, in a radiation-curable ink jet composition of the present disclosure, a glass transition temperature of the radiation-curable ink jet composition calculated from glass transition temperatures of all the monomers is 42° C. or higher. Accordingly, scratch resistance at room temperature can be enhanced.

A calculation method for the glass transition temperature of a radiation-curable ink jet composition will be described. The glass transition temperature of a radiation-curable ink jet composition is designated as $Tg_{All}$, the glass transition temperature of each monomer contained in the radiation-curable ink jet composition as $Tg_N$, and the content (mass %) of each monomer as $X_N$. N is a number from 1 in order corresponding to the types of monomers contained in the radiation-curable ink jet composition. For example, when three monomers are used, $Tg_1$, $Tg_2$, and $Tg_3$ are assigned. The glass transition temperature of each monomer is obtained from a safety data sheet (SDS) and/or catalogue information for the monomer. The glass transition temperature $Tg_{All}$ radiation-curable ink jet composition is a summed product of the glass transition temperature $Tg_N$ and the content $X_N$, which is calculated for each monomer. Accordingly, the following equation (2) is formulated.

$$Tg_{All} = \Sigma Tg_N \times X_N \quad (2)$$

1. 1. 1. Monofunctional Monomers

A radiation-curable ink jet composition of the present embodiment contains monofunctional monomers.

Monofunctional monomers of the present embodiment are not particularly limited and may be conventionally known monofunctional monomers that have a polymerizable functional group, particularly a polymerizable functional group containing a carbon-carbon unsaturated double bond. Moreover, an aromatic ring skeleton-containing monofunctional (meth)acrylate, for example, may be included as a monofunctional monomer.

An aromatic ring skeleton-containing monofunctional (meth)acrylate is a compound having an aromatic ring skeleton and one (meth)acryloyl group per molecule as a polymerizable functional group. Examples of the aromatic ring skeleton-containing monofunctional (meth)acrylate include, but are not limited to, benzyl (meth)acrylate, phenoxyethyl (meth)acrylate (PEA), polyalkylene glycol 2-phenoxyethyl ether (meth)acrylate, polyethylene glycol nonylphenyl ether (meth)acrylate, polyalkylene glycol nonylphenyl ether (meth)acrylate, polyethylene glycol p-cumylphenyl ether (meth)acrylate, and 2-hydroxy-3-phenoxypropyl (meth)acrylate. Exemplary commercial products of these (meth)acrylates include Viscoat #192 (from Osaka Organic Chemical Industry Ltd., trade name, phenoxyethyl acrylate), SR 340 (phenoxyethyl methacrylate), SR 339A (phenoxyethyl acrylate), SR 504 (polyethylene glycol nonylphenyl ether acrylate), CD 614 (polyalkylene glycol nonylphenyl ether acrylate), and CD 9087 (polyalkylene glycol 2-phenoxyethyl ether acrylate) (all from Sartomer, trade name).

When monofunctional monomers are illustrated in other expressions, examples of the monofunctional monomers may include a compound represented by the following general formula (3) and a compound represented by general formula (4).

$$CH_2=CR^4-COOR^5-Ar \quad (3)$$

$$CH_2=CR^4-COO-Ar \quad (4)$$

In the above formulae (3) and (4), $R^4$ is a hydrogen atom or a methyl group. In formula (3) above, Ar, which represents an aromatic ring skeleton, is a monovalent organic residue having at least one aryl group and a constituent carbon atom of the aryl group bonded with a group represented by $R^5$; and $R^5$ is a divalent organic residue having 1 to 4 carbon atoms. In formula (4) above, Ar, which represents an aromatic ring skeleton, is a monovalent organic residue having at least one aryl group and a constituent carbon atom of the aryl group bonded with —COO— in the formula.

In general formula (3) above, preferable examples of the group represented by $R^5$ include: an optionally substituted linear, branched, or cyclic alkylene group having 1 to 4 carbon atoms; and an optionally substituted alkylene group having 1 to 4 carbon atoms and an oxygen atom of an ether linkage and/or an ester linkage within the structure. Among these groups, an alkylene group having 1 to 4 carbon atoms, such as an ethylene group, an n-propylene group, an isopropylene group, and a butylene group as well as an alkylene group having 1 to 4 carbon atoms and an oxygen atom of an ether linkage within the structure, such as an oxyethylene group, an oxy-n-propylene group, an oxyisopropylene group, and an oxybutylene group, are suitable. When the above-described organic residue is an optionally substituted group, exemplary substituents include, but are not particularly limited to, a carboxyl group, an alkoxy group, a hydroxyl group, and a halo group. When such a substituent is a group containing a carbon atom, the carbon atom is counted into the carbon number of the organic residue.

In general formulae (3) and (4) above, examples of at least one aryl group contained in Ar (aryl) (aromatic ring skeleton) include, but are not limited to, a phenyl group and a naphthyl group. The number of the aryl group is one or more and preferably one or two. The aryl group may be substituted at the constituent carbon atoms other than a carbon atom that bonds with the organic residue represented by $R^5$ in formula (3), a carbon atom that bonds with —COO— in formula (4), and a carbon atom that connects aryl groups if a plurality of aryl groups are present. When the aryl group is substituted, the number of substitution per aryl group is one or more and preferably one or two. Examples of the substituents include, but are not particularly limited to, a linear, branched, or cyclic alkyl group and alkoxy group having 1 to 10 carbon atoms; a carboxyl group, a halo group, and a hydroxyl group.

Incorporation of an aromatic ring skeleton-containing monofunctional (meth)acrylate is preferable since solubility of polymerization initiators described hereinafter tends to become satisfactory, thereby enhancing curing properties. In particular, when an acylphosphine oxide polymerization initiator or a thioxanthone derivative polymerization initiator is used, the solubility tends to become satisfactory. Among aromatic ring skeleton-containing monofunctional (meth) acrylates, phenoxyethyl (meth)acrylate and benzyl (meth)acrylate are preferable, and phenoxyethyl (meth)acrylate is further preferable due to lower odor. Furthermore, phenoxyethyl (meth)acrylate is preferable and phenoxyethyl acrylate (PEA) is particularly preferable since good compatibility with additives, such as a polymerization initiator;

low viscosity and odor; and further excellent reactivity (curing properties) can be achieved.

Further, aromatic ring skeleton-free monofunctional monomers may also be used. Specific examples include unsaturated carboxylic acids, such as (meth)acrylic acid, itaconic acid, crotonic acid, isocrotonic acid, and maleic acid; salts of these unsaturated carboxylic acids; unsaturated carboxylic acid esters, urethanes, amides, and anhydrides; acrylonitrile; styrene; various unsaturated polyesters, unsaturated polyethers, unsaturated polyamides, unsaturated urethanes; N-vinyl compounds, such as N-vinylformamide, N-vinylcarbazole, N-vinylacetamide, N-vinylpyrrolidone, and N-vinylcaprolactam; acrylamide derivatives, such as dimethylacrylamide (DMAA); and dimethylaminoethyl acrylate (DMAEA) benzyl chloride quaternary salt. These monofunctional monomers may be used alone or in combination.

From a viewpoint of achieving satisfactory curing properties of a radiation-curable ink jet composition, esters of monofunctional (meth)acrylic acids, in other words, monofunctional (meth)acrylates may be used as monofunctional monomers.

Examples of monofunctional (meth)acrylates include tert-butylcyclohexyl acrylate (TBCHA), isoamyl (meth)acrylate, stearyl (meth)acrylate, lauryl (meth)acrylate, octyl (meth) acrylate, decyl (meth)acrylate, isodecyl (meth)acrylate (IDA), isomyristyl (meth)acrylate, isostearyl (meth) acrylate, 2-hydroxybutyl (meth) acrylate, butoxyethyl (meth) acrylate, tetrahydrofurfuryl (meth)acrylate, isobornyl (meth) acrylate, 2-hydroxyethyl (meth)acrylate, 2-hydroxypropyl (meth)acrylate, lactone-modified flexible (meth) acrylates, tert-butylcyclohexyl methacrylate, dicyclopentanyl (meth) acrylate, dicyclopentenyloxyethyl (meth)acrylate, and 1,4-dioxaspiro [4.5]dec-2-ylmethyl (meth) acrylate.

Monofunctional monomers that are contained in a radiation-curable ink jet composition of the present embodiment preferably include a monomer having a glass transition temperature of 90° C. or higher.

By including a monomer having a glass transition temperature of 90° C. or higher, the glass transition temperature of a radiation-curable ink jet composition calculated from glass transition temperatures of all the monomers can be easily adjusted to 42° C. or higher. As a result, an effect of enhancing scratch resistance of a coating film at room temperature can be obtained.

Examples of the monofunctional monomer having a glass transition temperature of 90° C. or higher include N-vinylcaprolactam (NVC), acryloylmorpholine (ACMO), dicyclopentanyl acrylate, dicyclopentadienyl acrylate, and isobornyl acrylate. Particularly, N-vinylcaprolactam (NVC) and acryloylmorpholine (ACMO) are preferable. Scratch resistance of a coating film at room temperature can be enhanced further by N-vinylcaprolactam or acryloylmorpholine. Moreover, N-vinylcaprolactam can further enhance flexibility of a coating film, and acryloylmorpholine can reduce odor of a radiation-curable ink jet composition.

The content of such a monofunctional monomer having a glass transition temperature of 90° C. or higher is not particularly specified but is preferably adjusted such that the glass transition temperature of a radiation-curable ink jet composition calculated from glass transition temperatures of all the monomers is 42° C. or higher.

1. 1. 2. Polyfunctional Monomers

A radiation-curable ink jet composition of the present embodiment may contain a polyfunctional monomer.

As a polyfunctional monomer, the polyfunctional monomer [vinyl ether group-containing (meth)acrylate] represented by the following general formula (1) is preferably contained.

$$CH_2=CR^1—COOR^2—O—CH=CH—R^3 \quad (1)$$

where $R^1$ is a hydrogen atom or a methyl group, $R^2$ is a divalent organic residue having 1 to 20 carbon atoms, and $R^3$ is a hydrogen atom or a monovalent organic residue having 1 to 11 carbon atoms.

By including the monomer represented by general formula (1), the viscosity of a radiation-curable ink jet composition can be easily reduced. Due to reduced viscosity, stable discharge from an ink jet head can be achieved during printing by using a radiation-curable ink jet composition. In addition, satisfactory curing properties can be achieved by including the monomer represented by general formula (1). By achieving satisfactory curing properties, a printing speed can be increased. Accordingly, a radiation-curable ink jet composition suitable for printing can be obtained.

In general formula (1) above, the divalent organic residue having 2 to 20 carbon atoms, which is represented by $R^2$, is suitably an optionally substituted linear, branched, or cyclic alkylene group having 2 to 20 carbon atoms, an optionally substituted alkylene group having 2 to 20 carbon atoms and an oxygen atom of an ether linkage and/or an ester linkage within the structure, or an optionally substituted divalent aromatic group having 6 to 11 carbon atoms. Among these groups, an alkylene group having 2 to 6 carbon atoms, such as an ethylene group, an n-propylene group, an isopropylene group, and a butylene group; and an alkylene group having 2 to 9 carbon atoms and an oxygen atom of an ether linkage within the structure, such as an oxyethylene group, an oxy-n-propylene group, an oxyisopropylene group, and an oxybutylene group, are suitable. Moreover, from a viewpoint of further reducing viscosity and further enhancing curing properties of a radiation-curable ink jet composition, a compound having a glycol ether chain, in which $R^2$ is an alkylene group having 2 to 9 carbon atoms and an oxygen atom of an ether linkage within the structure, such as an oxyethylene group, an oxy-n-propylene group, an oxyisopropylene group, or an oxybutylene group, is more preferable.

In general formula (1) above, the monovalent organic residue having 1 to 11 carbon atoms, which is represented by $R^3$, is suitably an optionally substituted linear, branched, or cyclic alkyl group having 1 to 10 carbon atoms; or an optionally substituted aromatic group having 6 to 11 carbon atoms. Among these groups, an alkyl group having 1 to 2 carbon atoms, which is a methyl group or an ethyl group; and an aromatic group having 6 to 8 carbon atoms, such as a phenyl group and a benzyl group, are suitable.

When each of the above-mentioned organic residues is an optionally substituted group, such substituents are classified into a carbon atom-containing group and a carbon atom-free group. When such a substituent is a carbon atom-containing group, the carbon atom is counted into the carbon number of the organic residue. Examples of the carbon atom-containing group include, but are not limited to, a carboxyl group and an alkoxy group. Meanwhile, examples of the carbon atom-free group include, but are not limited to, a hydroxyl group and a halo group.

Specific examples of the compound represented by formula (1) include, but are not particularly limited to, 2-vinyloxyethyl (meth) acrylate, 3-vinyloxypropyl (meth) acrylate, 1-methyl-2-vinyloxyethyl (meth) acrylate, 2-vinyloxypropyl (meth) acrylate, 4-vinyloxybutyl (meth)

acrylate, 1-methyl-3-vinyloxypropyl (meth)acrylate, 1-vinyloxymethylpropyl (meth) acrylate, 2-methyl-3-vinyloxypropyl (meth) acrylate, 1,1-dimethyl-2-vinyloxyethyl (meth) acrylate, 3-vinyloxybutyl (meth) acrylate, 1-methyl-2-vinyloxypropyl (meth) acrylate, 2-vinyloxybutyl (meth) acrylate, 4-vinyloxycyclohexyl (meth) acrylate, 6-vinyloxyhexyl (meth) acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(2-vinyloxyethoxy) ethyl methacrylate, 2-(2-vinyloxyethoxy)ethyl acrylate (VEEA), 2-(vinyloxyisopropoxy)ethyl (meth) acrylate, 2-(vinyloxyethoxy)propyl (meth)acrylate, 2-(vinyloxyethoxy) isopropyl (meth) acrylate, 2-(vinyloxyisopropoxy) propyl (meth) acrylate, 2-(vinyloxyisopropoxy) propyl (meth) acrylate, 2-(vinyloxyethoxyethoxy) ethyl (meth) acrylate, 2-(vinyloxyethoxyisopropoxy) ethyl (meth) acrylate, 2-(vinyloxyisopropoxyethoxy) ethyl (meth) acrylate, 2-(vinyloxyisopropoxyisopropoxy) ethyl (meth)acrylate, 2-(vinyloxyethoxyethoxy) propyl (meth) acrylate, 2-(vinyloxyethoxyisopropoxy) propyl (meth) acrylate, 2-(vinyloxyisopropoxyethoxy) propyl (meth) acrylate, 2-(vinyloxyisopropoxyisopropoxy) propyl (meth) acrylate, 2-(vinyloxyethoxyethoxy) isopropyl (meth) acrylate, 2-(vinyloxyethoxyisopropoxy) isopropyl (meth)acrylate, 2-(vinyloxyisopropoxyethoxy) isopropyl (meth)acrylate, 2-(vinyloxyisopropoxyisopropoxy) isopropyl (meth)acrylate, 2-(vinyloxyethoxyethoxyethoxy) ethyl (meth) acrylate, 2-(vinyloxyethoxyethoxyethoxyethoxy) ethyl (meth) acrylate, 2-(isopropenoxyethoxy) ethyl (meth) acrylate, 2-(isopropenoxyethoxyethoxy) ethyl (meth) acrylate, 2-(isopropenoxyethoxyethoxyethoxy) ethyl (meth) acrylate, 2-(isopropenoxyethoxyethoxyethoxyethoxy) ethyl (meth) acrylate, polyethylene glycol monovinyl ether (meth)acrylate, and polypropylene glycol monovinyl ether (meth) acrylate. Among these specific examples, 2-(2-vinyloxyethoxy)ethyl acrylate (VEEA) is particularly preferable since the curing properties and viscosity of a radiation-curable ink jet composition are readily balanced.

A radiation-curable ink jet composition of the present embodiment may contain other polyfunctional monomers.

Examples of difunctional (meth)acrylates include diethylene glycol di(meth)acrylate, triethylene glycol di(meth) acrylate, tetraethylene glycol di(meth)acrylate, polyethylene glycol di(meth)acrylate, dipropylene glycol dimethacrylate, dipropylene glycol diacrylate (DPGDA), tripropylene glycol di(meth)acrylate, polypropylene glycol di(meth)acrylate, 1,4-butanediol di(meth)acrylate, 1,6-hexanediol di(meth) acrylate, 1,9-nonanediol di(meth)acrylate, neopentyl glycol di(meth)acrylate, tricyclodecanedimethanol (meth)acrylate, ethoxylated (ethylene oxide adduct of) bisphenol A di(meth) acrylate, propoxylated (propylene oxide adduct of) bisphenol A di(meth)acrylate, hydroxypivalic acid neopentyl glycol ester di(meth)acrylate, and polytetramethylene glycol di(meth)acrylate.

Examples of trifunctional or higher functional (meth) acrylates include trimethylolpropane tri(meth)acrylate, ethoxylated trimethylolpropane tri(meth)acrylate, pentaerythritol tri(meth)acrylate, pentaerythritol tetra(meth) acrylate, dipentaerythritol hexa(meth)acrylate, ditrimethylolpropane tetra(meth)acrylate, propoxylated glycerol tri (meth)acrylate, caprolactone-modified trimethylolpropane tri(meth)acrylate, ethoxylated pentaerythritol tetra(meth) acrylate, and caprolactam-modified dipentaerythritol hexa (meth)acrylate.

Moreover, oligomers (including dimers, trimers, and the like) and prepolymers, for example, may be used as trifunctional or higher functional (meth)acrylates. Oligomers and prepolymers containing above-described monomers as constituents may be used, for example.

A radiation-curable ink jet composition may contain a polyfunctional oligomer. By including a polyfunctional oligomer, it is possible to achieve excellent storage stability of a radiation-curable ink jet composition as well as particularly excellent scratch resistance and the like of a pattern to be formed. As such oligomers, for example, urethane oligomers, whose repeating structure is a urethane, and epoxy oligomers, whose repeating structure is an epoxy, are preferably used.

Polyfunctional acrylate oligomers may be oligoester acrylates, and examples include urethane acrylate oligomers, polyester acrylate oligomers, and epoxy acrylate oligomers. Examples of the urethane acrylate oligomers include aliphatic urethane acrylate oligomers, aromatic urethane acrylate oligomers, and aliphatic urethane acrylate oligomers are more preferable. In addition, urethane acrylate oligomers are preferably tetrafunctional or lower functional urethane acrylate oligomers, and difunctional urethane acrylate oligomers are more preferable.

1. 2. Polymerization Initiators

A radiation-curable ink jet composition of the present embodiment preferably contains a polymerization initiator that generates an active species upon exposure to radiation. Examples of polymerization initiators include, but are not particularly limited to, publicly known polymerization initiators, such as alkylphenone polymerization initiators, acylphosphine oxide polymerization initiators, titanocene-based polymerization initiators, and thioxanthone derivative polymerization initiators. Among these polymerization initiators, acylphosphine oxide polymerization initiators are preferable. By including an acylphosphine oxide polymerization initiator, a radiation-curable ink jet composition is more likely to have excellent curing properties and further excellent curing properties particularly in a curing process with light from a UV-LED.

Examples of the acylphosphine oxide polymerization initiators include 2,4,6-trimethylbenzoyldiphenylphosphine oxide, bis(2,4,6-trimethylbenzoyl)phenylphosphine oxide, and bis(2,6-dimethoxybenzoyl) (2,4,4-trimethylpentyl) phosphine oxide.

Exemplary commercial products of the acylphosphine oxide polymerization initiators include IRGACURE 819 [bis(2,4,6-trimethylbenzoyl)phenylphosphine oxide], IRGACURE 1800[25:75 mass ratio mixture of bis(2,6-dimethoxybenzoyl) (2,4,4-trimethylpentyl)phosphine oxide and 1-hydroxycyclohexyl phenyl ketone] and IRGACURE TPO (2,4,6-trimethylbenzoyldiphenylphosphine oxide) (all from BASF SE).

The polymerization initiators may be used alone or in combination. In view of excellent curing properties and solubility, the total content of the above-described polymerization initiators is 1% by mass or more and 20% by mass or less, more preferably 3% by mass or more and 15% by mass or less, further preferably 5% by mass or more and 10% by mass or less, and particularly preferably 7% by mass or more and 9% by mass or less, relative to the total mass (100% by mass) of a radiation-curable ink jet composition.

1. 3. Other Additives

A radiation-curable ink jet composition of the present embodiment may further contain additives, such as colorants, dispersants, slipping agents, photosensitizers, and polymerization inhibitors, as necessary.

1. 3. 1. Colorants

A radiation-curable ink jet composition of the present embodiment may further contain a colorant. By including a colorant, a radiation-curable ink jet composition of the present embodiment can be used as a colored radiation-curable ink jet composition. Colorants may be at least either of pigments and dyes.

Pigments

By using pigments as colorants, light resistance of a radiation-curable ink jet composition can be enhanced. Both inorganic pigments and organic pigments may be used as pigments.

As an inorganic pigment, carbon black [C.I. (Color Index Generic Name) Pigment Black 7], such as furnace black, lamp black, acetylene black, or channel black; iron oxide; or titanium oxide may be used.

Examples of organic pigments include azo pigments, such as insoluble azo pigments, condensed azo pigments, azo lake pigments, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (basic dye chelates and acid dye chelates, for example); lake dyes (lake basic dyes, lake acid dyes); nitro pigments; nitroso pigments; aniline black; and daylight fluorescent pigments.

More specifically, examples of carbon black used as a black pigment include No. 2300, No. 900, MCF 88, No. 33, No. 40, No. 45, No. 52, MA 7, MA 8, MA 100, No. 2200B, and the like (all from Mitsubishi Chemical Corporation); Raven 5750, Raven 5250, Raven 5000, Raven 3500, Raven 1255, Raven 700, and the like (all from Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all from CABOT JAPAN K.K.); Color Black FW 1, Color Black FW 2, Color Black FW 2V, Color Black FW 18, Color Black FW 200, Color Black S 150, Color Black S 160, Color Black S 170, Printex 35, Printex U, Printex V, Printex 140U, Special Black 6, Special Black 5, Special Black 4A, and Special Black 4 (all from Degussa).

Exemplary white pigments include C.I. Pigment White 6, 18, and 21.

Exemplary yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Exemplary magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Exemplary cyan pigments include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of pigments other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The above-described pigments may be used alone or in combination. When such pigments are used, the average particle size is preferably 300 nm or less and more preferably 50 nm to 200 nm. When the average particle size falls within the above-mentioned ranges, a radiation-curable ink jet composition exhibits further excellent reliability in discharge stability, dispersion stability, and the like and can form images with excellent quality. The average particle size herein is a $D_{50}$ value measured by a dynamic light scattering method.

Dyes

Dyes may also be used as colorants. Such dyes are not particularly limited, and acid dyes, direct dyes, reactive dyes, and basic dyes may be used. Examples of dyes include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

The above-described dyes may be used alone or in combination.

The total content of colorants is preferably 1% by mass or more and 20% by mass or less relative to the total mass (100% by mass) of a radiation-curable ink jet composition. A clear ink containing no colorants or containing a colorant without intention of coloration (0.1% by mass or less, for example) may also be used.

1. 3. 2. Dispersants

When a radiation-curable ink jet composition contains a pigment, a dispersant may additionally be contained to further enhance pigment dispersibility. Examples of dispersants include, but are not particularly limited to, dispersants commonly used for preparing pigment dispersions, such as polymer dispersants. Specific examples include dispersants primarily containing one or more of propoxylated ethylenediamine, vinyl polymers or copolymers, acrylic polymers and copolymers, polyesters, polyamides, polyimides, polyurethanes, amino polymers, silicon-containing polymers, sulfur-containing polymers, fluorine-containing polymers, and epoxy resins. Exemplary commercial products of polymer dispersants include Ajisper series from Ajinomoto Fine-Techno Co., Inc., Solsperse series (Solsperse 36000, for example) available from Avecia or Noveon, Disperbyk series from BYK Additives & Instruments, and Disparlon series from Kusumoto Chemicals, Ltd.

1. 3. 3. Polymerization Inhibitors

A radiation-curable ink jet composition of the present embodiment may further contain a hindered amine compound or other compounds as polymerization inhibitors. Examples of polymerization inhibitors include, but are not limited to, hydroquinone monomethyl ether (MEHQ), 4-hydroxy-2, 2,6,6-tetramethylpiperidine-N-oxyl, hydroquinone, cresol, tert-butylcatechol, 3,5-di-tert-butyl-4-hydroxytoluene, 2,2'-methylenebis(4-methyl-6-tert-butylphenol), 2,2'-methylenebis (4-ethyl-6-butylphenol), and 4,4'-thiobis(3- methyl-6-tert-butylphenol). Polymerization inhibitors may be used alone or in combination.

The total content of polymerization inhibitors is preferably 0.05% by mass or more and 0.5% by mass or less and more preferably 0.1% by mass or more and 0.5% by mass or less, relative to the total mass (100% by mass) of a radiation-curable ink jet composition.

1. 3. 4. Slipping Agents

A radiation-curable ink jet composition of the present embodiment may further contain a slipping agent. Slipping agents are preferably silicone surfactants and more preferably polyester-modified silicones or polyether-modified silicones. Examples of the polyester-modified silicones include BYK-347 and 348: BYK-UV 3500, 3510, and 3530 (all from BYK Additives & Instruments), and examples of the polyether-modified silicones include BYK-3570 (from BYK Additives & Instruments). Slipping agents may be used alone or in combination.

The total content of slipping agents is preferably 0.01% by mass or more and 2% by mass or less and more preferably 0.05% by mass or more and 1% by mass or less, relative to the total mass (100% by mass) of a radiation-curable ink jet composition.

1. 3. 5. Photosensitizers

A radiation-curable ink jet composition of the present embodiment may further contain a photosensitizer. Examples of the photosensitizer include amine compounds (aliphatic amines, aromatic group-containing amines, piperidine, reaction products of epoxy resins and amines, and triethanolamine triacrylate, for example), urea compounds (allylthiourea and o-tolylthiourea, for example), sulfur compounds (sodium diethyl dithiophosphate and aromatic sulfinate soluble salts, for example), nitrile compounds (p-diethylaminobenzonitrile, for example), phosphorus compounds (tri-n-butylphosphine and sodium diethyl dithiophosphide, for example), nitrogen compounds (Michler's ketone, N-nitrosohydroxylamine derivatives, oxazolidine compounds, tetrahydro-1,3-oxazine compounds, and formaldehyde or acetaldehyde-diamine condensates, for example), and chlorine compounds (carbon tetrachloride and hexachloroethane, for example).

1. 4. Physical Properties

A radiation-curable ink jet composition of the present embodiment has a viscosity at 20° C. of preferably 25 mPa•s or less and more preferably 5 mPa•s to 25 mPa•s. When the viscosity at 20° C. of the composition falls within this range, an appropriate amount of the composition is discharged from a nozzle, thereby further suppressing curved flight and/or scattering of the composition. Accordingly, such a composition can suitably be used for an ink jet recording apparatus. The viscosity can be measured with a viscoelasticity tester MCR-300 (from Anton Paar) by increasing a shear rate from 10 to 1000 in an environment of 20° C. and reading the viscosity at a shear rate of 200.

A radiation-curable ink jet composition of the present embodiment has a surface tension at 20° C. of preferably 20 mN/m or more and 40 mN/m or less. When the surface tension at 20° C. of the radiation-curable ink jet composition falls within this range, the composition is less likely to wet a nozzle surface that has underwent liquid-repellent treatment. Consequently, a normal and appropriate amount of the composition is discharged from the nozzle, thereby achieving further suppressed curved flight and/or scattering of the composition. Accordingly, such a composition can suitably be used for an ink jet recording apparatus. The surface tension can be measured with an automatic surface tensiometer CBVP-Z (from Kyowa Interface Science Co., Ltd.) by observing the surface tension when a platinum plate is wet with a radiation-curable ink jet composition in an environment of 20° C.

1. 5. Manufacturing Method for Composition

Manufacture (preparation) of a radiation-curable ink jet composition is performed by mixing and stirring each component to be contained in the composition such that the components are mixed satisfactorily uniformly. In the present embodiment, the preparation of a radiation-curable ink jet composition preferably includes, in the process, a step of performing at least either of ultrasonic treatment and heating treatment of a mixture of a polymerization initiator and at least part of monomers. Consequently, the amount of dissolved oxygen in the composition after preparation can be decreased, and it is possible to obtain a radiation-curable ink jet composition having excellent discharge stability and/or storage stability. Such a mixture may contain at least the above-mentioned components, may further contain other components to be contained in a radiation-curable ink jet composition, or may contain all the components to be contained in a radiation-curable ink jet composition. The monomers contained in the mixture may be at least part of the monomers to be contained in a radiation-curable ink jet composition.

2. Ink Jet Recording Method

An ink jet recording method of the present embodiment includes: attaching the above-described radiation-curable ink jet composition to a recording medium; and subsequently irradiating the radiation-curable ink jet composition on the recording medium with light from a UV-LED (UV light-emitting diode). Consequently, a coating film is formed in a portion on the recording medium to which the radiation-curable ink jet composition is applied.

2. 1. Attaching Step

In the above step of attaching a radiation-curable ink jet composition to a recording medium, a publicly known ink jet recording apparatus can be used. As described above, during discharge of a radiation-curable ink jet composition, the viscosity at 20° C. of the radiation-curable ink jet composition is set to preferably 25 mPa•s or lower and more preferably 5 mPa•s to 25 mPa•s. When the viscosity of the radiation-curable ink jet composition falls within this range, the composition can be discharged at room temperature or without heating. Meanwhile, the viscosity of a radiation-curable ink jet composition may be adjusted to a preferable viscosity by heating to a predetermined temperature and then discharged. As a result, good discharge stability can be realized.

A radiation-curable ink jet composition has a viscosity higher than aqueous ink compositions commonly employed for ink jet uses and thus exhibits large viscosity variations due to temperature fluctuations during discharge. Such viscosity variations of a radiation-curable ink jet composition considerably affect changes in droplet size and changes in droplet discharge speed. Consequently, deterioration in image quality may result. Accordingly, the temperature of a radiation-curable ink jet composition is preferably kept as constant as possible during discharge.

Exemplary materials for recording media include, but are not particularly limited to, plastics, such as polyvinyl chloride, polyethylene terephthalate, polypropylene, polyethylene, polycarbonates, cellulose diacetate, cellulose triacetate, cellulose propionate, cellulose butyrate, cellulose acetate butyrate, cellulose nitrate, polystyrene, and polyvinyl acetal; surface-processed these plastics; glass; paper; metal; and wood.

The form of the recording media is also not particularly limited, and examples include a film, a board, and a fabric.

A coating film formed on such a recording medium for sign uses is subjected to post processing, such as cutting and/or bending. Since the above-described ink jet composition has good flexibility and adhesion, it is possible to suppress cracking and/or chipping of a coating film during such post processing. Accordingly, a radiation-curable ink jet composition of the present embodiment can be suitably employed for sign uses.

2. 2. Curing Process (Light Irradiation Step)

In the subsequent curing step, the radiation-curable ink jet composition that has been applied to the recording medium is cured by irradiation with light from a UV-LED to form a coating film. This is because a polymerization initiator optionally contained in the radiation-curable ink jet composition decomposes upon UV irradiation to generate a reactive species (initiating species), such as radicals, acids, and bases, and polymerization reactions of monomers are promoted by the action of the initiating species, or because photopolymerization reactions of monomers are initiated upon UV irradiation. On such an occasion, if a sensitizing dye, together with a polymerization initiator, is present in the radiation-curable ink jet composition, the sensitizing dye in the system is excited upon absorption of actinic radiation and promotes decomposition of the polymerization initiator by coming into contact with the polymerization initiator. Consequently, further high-sensitivity curing reactions can be achieved.

Moreover, by using a UV-LED as a UV source, a smaller apparatus and/or a reduced cost can be realized. A UV-LED as a UV source is small and thus can be fitted inside an ink jet recording apparatus. For example, such a UV-LED can be fixed to a carriage (at both edges in the medium width direction and/or on the side in the medium conveying direction) on which an ink jet head that discharges a radiation-curable ink jet composition is mounted. Further, due to the above-described composition of a radiation-curable ink jet composition, low-energy high-speed curing can be realized. Here, irradiation energy is calculated by multiplying irradiation time by irradiation intensity. Accordingly, irradiation time can be reduced, thereby increasing a printing speed. Meanwhile, it is also possible to lower irradiation intensity. Consequently, a temperature rise of a printed article can be suppressed, thereby resulting in low odor of a cured film.

3. EXAMPLES

Hereinafter, the present disclosure will be described further specifically with reference to experimental examples. The present disclosure, however, is not limited to these examples.

3. 1. Preparation of Ink Jet Composition

First, a pigment dispersion in which a colorant is dispersed in monomers was obtained by weighing a colorant, a dispersant, and part of each monomer, feeding the weighed components to a pigment dispersing tank, adding ceramic beads having a diameter of 1 mm to the tank, and stirring. Subsequently, a radiation-curable ink jet composition of each example was obtained by feeding, to a mixture tank that is a stainless steel container, the remaining monomers, a polymerization initiator, and a polymerization inhibitor so as to have the composition shown in Table 1, completely dissolving these components through mixing/stirring, subsequently adding the pigment dispersion described above to the tank, further mixing/stirring at ambient temperature for one hour, and filtering through a 5 μm-membrane filter. The numerical value of each component for each example in the Table represents mass %.

TABLE 1

| | | | Tg (° C.) | Example | | | | | | | | | Comparative Example | | | |
|---|---|---|---|---|---|---|---|---|---|---|---|---|---|---|---|---|
| | | | | 1 | 2 | 3 | 4 | 5 | 6 | 7 | 8 | 9 | 1 | 2 | 3 | 4 |
| Composition (mass %) | Monofunctional monomer | PEA | −22 | 39.3 | 42.0 | 38.2 | 39.5 | 36.5 | 46.7 | 32.2 | 38.7 | 38.5 | 38.8 | 44.3 | 43.7 | 39.7 |
| | | NVC | 90 | 11.0 | 14.5 | 26.8 | 26.8 | 26.8 | 0.0 | 44.2 | 0.0 | 26.8 | 9.0 | 19.5 | 23.8 | 26.8 |
| | | ACMO | 145 | 20.0 | 19.8 | 11.3 | 12.0 | 13.0 | 29.7 | 0.0 | 10.8 | 10.8 | 20.4 | 18.4 | 8.8 | 9.8 |
| | | IBXA | 94 | 0.0 | 0.0 | 0.0 | 0.0 | 0.0 | 0.0 | 0.0 | 26.8 | 0.0 | 0.0 | 0.0 | 0.0 | 0.0 |
| | | TBCHA | 38 | 1.0 | 1.0 | 3.0 | 3.0 | 3.0 | 3.0 | 3.0 | 3.0 | 3.0 | 0.0 | 0.0 | 3.0 | 3.0 |
| | Polyfunctional monomer | VEEA | 39 | 9.0 | 3.0 | 1.0 | 1.0 | 1.0 | 1.0 | 1.0 | 1.0 | 0.0 | 12.1 | 0.0 | 1.0 | 1.0 |
| | | DPGDA | 104 | 0.0 | 0.0 | 0.0 | 0.0 | 0.0 | 0.0 | 0.0 | 0.0 | 1.0 | 0.0 | 0.0 | 0.0 | 0.0 |
| | Difunctional urethane acrylate | CN991 | 27 | 2.0 | 2.0 | 2.0 | 0.0 | 2.0 | 2.0 | 2.0 | 2.0 | 2.0 | 2.0 | 0.0 | 2.0 | 2.0 |
| | Polymerization initiator | Irg.819 | — | 4.0 | 4.0 | 4.0 | 4.0 | 4.0 | 4.0 | 4.0 | 4.0 | 4.0 | 4.0 | 4.0 | 4.0 | 4.0 |
| | | TPO | — | 4.0 | 4.0 | 4.0 | 4.0 | 4.0 | 4.0 | 4.0 | 4.0 | 4.0 | 4.0 | 4.0 | 4.0 | 4.0 |
| | Polymerization inhibitor | MEHQ | — | 0.1 | 0.1 | 0.1 | 0.1 | 0.1 | 0.1 | 0.1 | 0.1 | 0.1 | 0.1 | 0.1 | 0.1 | 0.1 |
| | Slipping agent | BYK-UV3500 | — | 0.5 | 0.5 | 0.5 | 0.5 | 0.5 | 0.5 | 0.5 | 0.5 | 0.5 | 0.5 | 0.5 | 0.5 | 0.5 |
| | Pigment | Carbon black | — | 2.0 | 2.0 | 2.0 | 2.0 | 2.0 | 2.0 | 2.0 | 2.0 | 2.0 | 2.0 | 2.0 | 2.0 | 2.0 |
| | Dispsersant | solsperse 36000 | — | 0.2 | 0.2 | 0.2 | 0.2 | 0.2 | 0.2 | 0.2 | 0.2 | 0.2 | 0.2 | 0.2 | 0.2 | 0.2 |
| Physical properties | | Proportion of monofunctional monomers (mass %) | — | 86.6 | 93.9 | 96.4 | 98.8 | 96.4 | 96.4 | 96.4 | 96.4 | 96.3 | 82.9 | 100.0 | 96.4 | 96.4 |

TABLE 1-continued

|  |  | Tg (° C.) | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 |
|---|---|---|---|---|---|---|---|---|---|---|---|---|---|---|---|
| Evaluation item | Glass transition temperature (° C.) | — | 42 | 42 | 42 | 42 | 45 | 42 | 42 | 42 | 42 | 42 | 42 | 32 | 39 |
|  | Flexibility | — | C | A | A | A | A | A | A | A | A | D | A | A | A |
|  | Adhesion | — | C | B | A | A | A | A | A | A | A | D | A | A | A |
|  | Scratch resistance | — | B | C | C | C | C | C | C | C | C | B | D | D | D |

The abbreviations and components of the products in Table 1 are as follows.

Monomers

PEA (trade name "Viscoat #192", from Osaka Organic Chemical Industry Ltd., phenoxyethyl acrylate)
NVC (from ISP Japan, N-vinylcaprolactam)
ACMO (from KJ Chemical Corporation, acryloylmorpholine)
IBXA (from Osaka Organic Chemical Industry Ltd., isobornyl acrylate)
TBCHA (trade name "SR 217", from Sartomer, tert-butylcyclohexyl acrylate)
VEEA (from Nippon Shokubai Co., Ltd., 2-(2-vinyloxyethoxy) ethyl acrylate)
DPGDA (trade name "SR 508", from Sartomer, dipropylene glycol diacrylate)
CN 991 (from Sartomer, difunctional urethane acrylate oligomer)

Polymerization Initiators

Irg. 819 (trade name "IRGACURE 819", from BASF, bis(2,4,6-trimethylbenzoyl)phenylphosphine oxide)
TPO (trade name "IRGACURE TPO", from BASF, 2,4,6-trimethylbenzoyldiphenylphosphine oxide)

Polymerization Inhibitor

MEHQ (trade name "p-methoxyphenol", from Kanto Chemical Co., Inc., hydroquinone monomethyl ether)

Slipping Agent

BYK-UV 3500 (from BYK Additives & Instruments, acryloyl group-containing polyether-modified polydimethylsiloxane)

Colorant (Pigment)

Carbon black (trade name "MA-100", from Mitsubishi Chemical Corporation)

Dispersant

Solsperse 36000 (from Lubrizol, polymer dispersant)

Example 1 is a radiation-curable ink jet composition containing the monomers shown in Table 1 and having a proportion of the monofunctional monomers of 86% by mass relative to all the monomers and a glass transition temperature of 42° C.
Example 2 is a radiation-curable ink jet composition in which a proportion of the monomers is changed from Example 1 to 94% by mass relative to all the monomers by adjusting the content ratios of the monomers.
Example 3 is a radiation-curable ink jet composition in which a proportion of the monofunctional monomers is changed from Example 1 to 96% by mass relative to all the monomers by adjusting the content ratios of the monomers.
Example 4 is a radiation-curable ink jet composition in which a proportion of the monofunctional monomers is changed from Example 1 to 99% by mass relative to all the monomers by adjusting the content ratios of the monomers.
Example 5 is a radiation-curable ink jet composition in which a glass transition temperature is changed from Example 3 to 45° C. by adjusting the content ratios of the monomers.
Example 6 is a radiation-curable ink jet composition in which NVC is removed from Example 3 and the content ratios of the monomers are changed.
Example 7 is a radiation-curable ink jet composition in which ACMO is removed from Example 3 and the content ratios of the monomers are changed.
Example 8 is a radiation-curable ink jet composition in which NVC is replaced by IBXA in Example 3 and the content ratios of the monomers are changed.
Example 9 is a radiation-curable ink jet composition in which VEEA is replaced by DPGDA in Example 3 and the content ratios of the monomers are changed.
Comparative Example 1 is a radiation-curable ink jet composition in which TBCHA is removed from Example 1 and a proportion of the monofunctional monomers is changed to 83% by mass relative to all the monomers by changing the content ratios of the monomers.
Comparative Example 2 is a radiation-curable ink jet composition in which TBCHA, VEEA, and CN 991 are removed from Example 1 and a proportion of the monofunctional monomers is changed to 100% by mass relative to all the monomers by adjusting the content ratios of the monomers.
Comparative Example 3 is a radiation-curable ink jet composition in which a glass transition temperature is changed from Example 3 to 32° C. by adjusting the content ratios of the monomers.
Comparative Example 4 is a radiation-curable ink jet composition in which a glass transition temperature is changed from Example 3 to 39° C. by adjusting the content ratios of the monomers.

3. 2. Evaluation Methods 3. 2. 1. Evaluation of Flexibility

Each radiation-curable ink jet composition was applied at a thickness of 10 μm to a polyvinyl chloride film (JT 5829R, from Mactac) with a bar coater. Subsequently, the applied composition was cured with a metal halide lamp (from Eye Graphics, Co., Ltd.) at an energy of 400 mJ/cm² to form a coating film. A release paper of the polyvinyl chloride film, on which the coating film had been formed, was removed, and a test piece was prepared by cutting out the polyvinyl chloride film into a strip having a width of 1 cm and a length of 8 cm. Elongation as flexibility was measured for each test piece by using a tensile tester (TENSILON, from Orientec Co., Ltd.). Elongation is a numerical value when cracking arises during pulling at 5 mm/min. The numerical value was calculated from [(length when cracking arises−length before stretching)/length before stretching×100]. Evaluation criteria are as follows, and the results are shown in Table 1.
A: 300% or more
B: 250% or more and less than 300%
C: 200% or more and less than 250%
D: less than 200%

3. 2. 2. Evaluation of Adhesion

The cured coating film prepared for the above-described evaluation of flexibility was evaluated by a cross-cut test in accordance with JIS K 5600-5-6. The evaluation criteria are as follows. The evaluation results are shown in Table 1.
A: Class 0 and 1
B: Class 2 and 3
C: Class 4 and 5
D: no residual coating film

3. 2. 3. Evaluation of Scratch Resistance

The cured coating film prepared for the above-described evaluation of flexibility was evaluated by a microscratch test in accordance with JIS R 3255. Withstand load as scratch resistance was measured by using an ultrathin film scratch tester (CSR-5000, from Nanotec Corporation). Withstand load is a load when a stylus reaches a medium surface in microscratching under load. The measurement was performed at a stylus diameter: 15 μm, an amplitude: 100 μm, and a scratching speed 10 μm/sec. The evaluation criteria are as follows. The evaluation results are shown in Table 1.
A: 35 mN or more
B: 30 mN or more and less than 35 mN
C: 25 mN or more and less than 30 mN
D: less than 25 mN

3.3. Evaluation Results

Table 1 shows the composition of a radiation-curable ink jet composition in each example as well as the evaluation results. Table 1 reveals that the radiation-curable ink jet compositions of Examples 1 to 9, in which the content of monofunctional monomers is 86% by mass or more relative to all the monomers and a glass transition temperature of each radiation-curable ink jet composition calculated from glass transition temperatures of all the monomers is 42° C. or higher, show good flexibility, adhesion, and scratch resistance of C or better. Specifically, in comparison among Examples 1 to 4, Comparative Example 1, and Comparative Example 2, it is found that flexibility and adhesion are enhanced in Examples 1 to 4 by setting a proportion of the monofunctional monomers to 86% by mass or more relative to all the monomers. In contrast, Comparative Example 2 exhibits good flexibility and adhesion, but poor scratch resistance of evaluation D. Moreover, in comparison among Examples 3, Example 5, Comparative Example 3, and Comparative Example 4, it is revealed that scratch resistance is ensured when a glass transition temperature of a radiation-curable ink jet composition is 42° C. or higher.

Hereinafter, the matters derived from the embodiments will be described.

A radiation-curable ink jet composition of the present disclosure contains 86% by mass or more of monofunctional monomers relative to all the monomers and has a glass transition temperature of the radiation-curable ink jet composition calculated from glass transition temperatures of all the monomers is 42° C. or higher.

According to this constitution, it is possible to enhance flexibility and adhesion of a coating film while ensuring scratch resistance. Specifically, since a proportion of monofunctional monomers is 86% by mass or more relative to all the monomers, flexibility and adhesion of a coating film are enhanced. In addition, since a glass transition temperature of a radiation-curable ink jet composition calculated from glass transition temperatures of all the monomers is 42° C. or higher, scratch resistance of a coating film at room temperature is enhanced. Accordingly, it is possible to provide a radiation-curable ink jet composition that can form a coating film having flexibility, adhesion, and scratch resistance that are suitable for sign uses.

The above-described radiation-curable ink jet composition may contain a monomer represented by the following general formula (1):

$$CH_2=CR^1-COOR^2-O-CH=CH-R^3 \tag{1}$$

where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

According to this constitution, it is possible to easily lower the viscosity of the radiation-curable ink jet composition since the monomer represented by general formula (1) is contained. Such low viscosity enables stable discharge from an ink jet head when printing is performed by using the radiation-curable ink jet composition. In addition, good curing properties can be achieved by including the monomer represented by general formula (1). Good curing properties can in turn increase a printing speed. Accordingly, a radiation-curable ink jet composition suitable for printing can be obtained.

In the radiation-curable ink jet composition, the monofunctional monomers may contain a monofunctional monomer having a glass transition temperature of 90° C. or higher.

According to this constitution, it is possible to easily adjust a glass transition temperature of the radiation-curable ink jet composition calculated from glass transition temperatures of all the monomers to 42° C. or higher since a monomer having a glass transition temperature of 90° C. or higher is contained. Accordingly, an effect of enhancing scratch resistance of a coating film at room temperature can be obtained.

In the radiation-curable ink jet composition, any of the monofunctional monomers may be N-vinylcaprolactam or acryloylmorpholine.

According to this constitution, it is possible to further enhance scratch resistance of a coating film at room temperature since N-vinylcaprolactam or acryloylmorpholine has a glass transition temperature of 90° C. or higher. In addition, N-vinylcaprolactam can further enhance flexibility of a coating film, and acryloylmorpholine can reduce odor of the radiation-curable ink jet composition.

An embodiment of the ink jet recording method of the present disclosure may include: attaching the above-described radiation-curable ink jet composition to a recording medium; and irradiating the radiation-curable ink jet composition with light from a UV-LED.

According to this constitution, a coating film having excellent flexibility, adhesion, and scratch resistance can be obtained.

What is claimed is:

1. A radiation-curable ink jet composition comprising
a plurality of monomers, the monomers including 86% by mass or more of one or more monofunctional monomers relative to all the monomers,
wherein the plurality of monomers include monomers having a glass transition temperature higher than 42° C. and monomers having a glass transition temperature less than 42° C. such that a cumulative glass transition temperature of the radiation-curable ink jet composition calculated from glass transition temperatures of all the monomers is 42° C. or higher.

2. The radiation-curable ink jet composition according to claim 1, wherein the monomers include a monomer represented by the following general formula (1):

$$CH_2=CR^1-COOR^2-O-CH=CH-R^3 \qquad (1)$$

where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

3. The radiation-curable ink jet composition according to claim 1, wherein the monofunctional monomers include a monomer having a glass transition temperature of 90° C. or higher.

4. The radiation-curable ink jet composition according to claim 1, wherein any of the monofunctional monomers is N-vinylcaprolactam or acryloylmorpholine.

5. An ink jet recording method comprising:
attaching, to a recording medium, the radiation-curable ink jet composition according to claim 1; and
irradiating the radiation-curable ink jet composition with light from a UV-LED.

* * * * *